March 12, 1963  E. GRANIER  3,081,412
ALTERNATOR ARMATURE TEETH
Filed Sept. 30, 1959
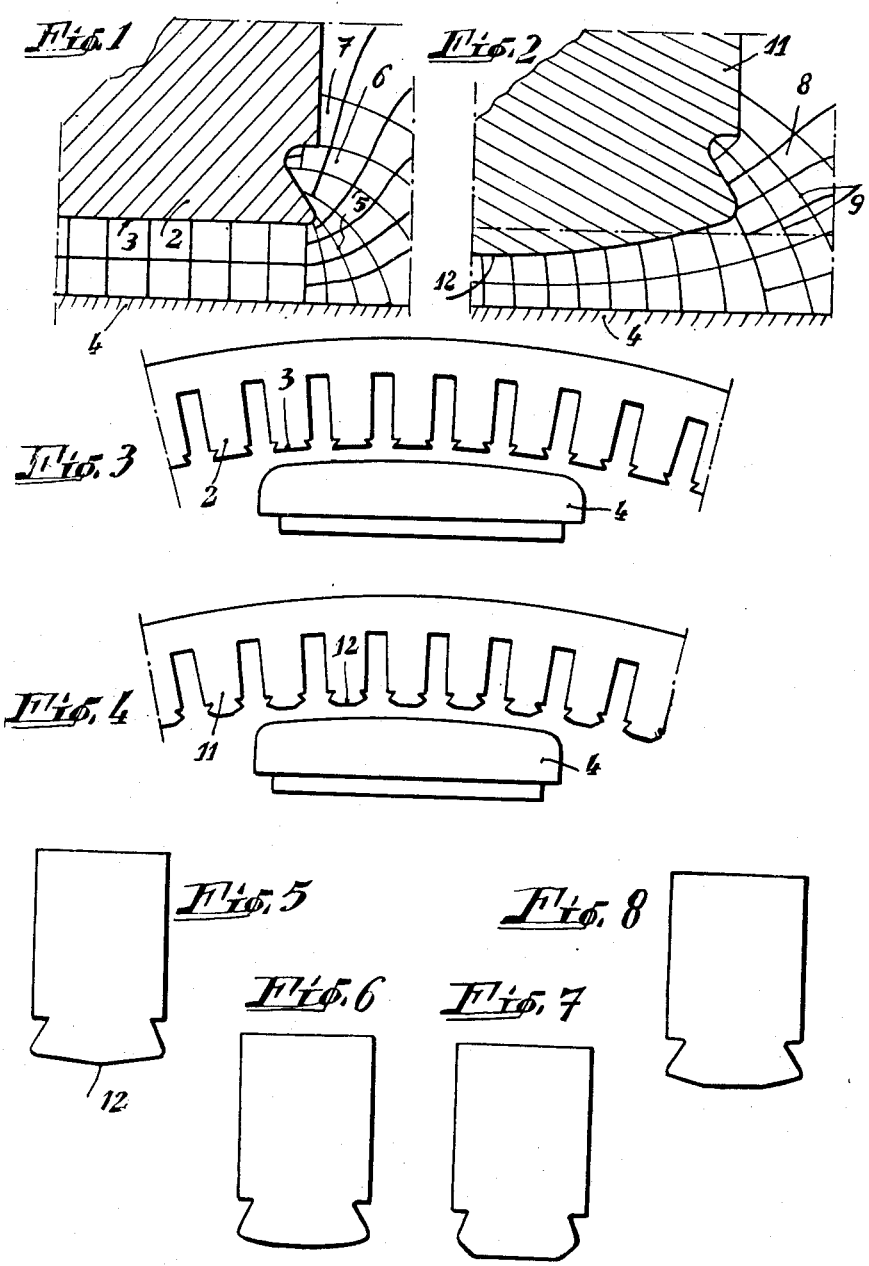

United States Patent Office 3,081,412
Patented Mar. 12, 1963

3,081,412
ALTERNATOR ARMATURE TEETH
Emile Granier, Lyon, France, assignor to Laborde &
Kupfer, Lyon, France, a company of France
Filed Sept. 30, 1959, Ser. No. 843,470
Claims priority, application France Oct. 23, 1958
4 Claims. (Cl. 310—258)

My invention relates to an alternator provided with a stationary annular armature surrounding a field rotor.

An object of the invention is to improve the concentration of magnetic lines of force in the central section of the laminations forming the armature teeth.

According to my invention, the armature teeth are convex at the ends thereof facing the rotor, so that the gap between each tooth and the rotor is substantially narrower in the part registering with the medial part of said tooth. This provides a reduction in the losses arising through marginal deformation of the flux, together with a reduction of the ampere-turns and, consequently, further provides a saving in the windings or a reduction in the intensity of the current required in the rotor windings.

I will now disclose my invention with reference to the accompanying drawing illustrating by way of example a preferred embodiment of my invention. In said drawing:

FIG. 1 is a so-called Lehmann diagram showing the losses arising through a deformation of the flux in the case of an armature tooth associated with a gap of constant breadth;

FIG. 2 is a corresponding diagram showing the losses in the case of a tooth associated with a gradually varying gap according to my invention;

FIG. 3 shows a pole of the field rotor with a plurality of armature teeth on the laminated stator, the gap between said armature teeth and pole being constant;

FIG. 4 illustrates similarly a gap of a varying size according to my invention; and FIGS. 5 to 8 show various outlines for the execution of said varying gap according to my invention.

The diagram in FIG. 1 refers to an armature tooth 2 having a rectilinear outline 3, facing the outer surface of the pole on the field rotor 4. The lines of force 5 are particularly close at 6 near the notch 7 formed laterally of the tooth. The diagram of FIG. 2 shows in contradistinction at 8 a more advantageous distribution of the lines of force 9, which is ascribable to the fact that the outline of the tooth 11 lies nearer the rotor 4 at its middle section than at its outer sections.

The same result may be obtained with different tooth outlines, the essential feature of which lies in the fact that its medial section is nearer the field rotor.

In the embodiment illustrated in FIG. 5, the tooth outline is shown with an apex 12 which projects inwardly of the stator to face the location of the poles such as 4 (FIG. 3).

In FIG. 6, this apex is replaced by an arcuate line of a large radius, the convexity of which faces the rotor. Lastly, FIGS. 7 and 8 refer to modifications wherein the tooth outline includes a central section tangent to a circle lying in a plane perpendicular to the rotor axis and concentric with the latter, said section extending at either end into oblique sections directed outwardly with reference to said axis and terminating in substantial registry with the lateral surfaces of the tooth.

What I claim is:

1. An alternator comprising a rotor including outwardly facing pole pieces and an annular stator encircling said rotor at least in part and including a multitude of inwardly extending teeth which are generally radially disposed and which define therebetween a multitude of radially disposed openings, said pole pieces including extremities of a size whereby the extremities oppose a plurality of said teeth, each of said teeth having an extremity providing a substantially greater radially inward extent at the medial position thereof than at the portions thereof adjacent said openings so that each tooth defines with the opposed pole extremity an air gap which is narrowest at the medial portion of the corresponding tooth whereby to ameliorate flux concentration of adjacent said openings.

2. An alternator as claimed in claim 1 wherein each tooth extremity is convex.

3. An alternator as claimed in claim 1 wherein each tooth extremity is dihedral.

4. An alternator as claimed in claim 1 wherein each tooth extremity is of a shape including a central section tangent to a circle coaxial with said rotor and lateral sections oblique to said central section.

References Cited in the file of this patent

UNITED STATES PATENTS 1,008,561    Reist ------------------ Nov. 14, 1911

FOREIGN PATENTS 190,586    Austria ------------------ July 10, 1957